(12) United States Patent
Gavin

(10) Patent No.: US 11,484,974 B1
(45) Date of Patent: Nov. 1, 2022

(54) KITS AND METHODS FOR DUMPSTER BOTTOM REPLACEMENT

(71) Applicant: Plastic Recovery Technologies Corporation, Schaumburg, IL (US)

(72) Inventor: Kevin Paul Gavin, Northbrook, IL (US)

(*) Notice: Subject to any disclaimer, the term of this patent is extended or adjusted under 35 U.S.C. 154(b) by 0 days.

(21) Appl. No.: 17/410,409

(22) Filed: Aug. 24, 2021

(51) Int. Cl.
  *B23P 6/04* (2006.01)
  *B65F 1/02* (2006.01)
(52) U.S. Cl.
  CPC .. *B23P 6/04* (2013.01); *B65F 1/02* (2013.01)
(58) Field of Classification Search
  CPC ..................................... B65F 1/02; B23P 6/04
  See application file for complete search history.

(56) References Cited

U.S. PATENT DOCUMENTS 6,634,541 B1 * 10/2003 Hankey .............. B23K 37/0443
                                                        228/171

FOREIGN PATENT DOCUMENTS

CN          110980086 A  *  4/2020

OTHER PUBLICATIONS

Carbon steel, Wikipedia, the free encyclopedia, Last edited on Mar. 23, 2021, at 23:45 (UTC).
Dumpster, Wikipedia, the free encyclopedia, Last edited on Mar. 21, 2021, at 08:09 (UTC).
Fixture (tool), Wikipedia, the free encyclopedia, Last edited on Apr. 2, 2021, at 19:54 (UTC).
Lift Table, Wikipedia, the free encyclopedia, Last edited on Jul. 5, 2020, at 01:06 (UTC).

* cited by examiner

*Primary Examiner* — Bayan Salone
(74) *Attorney, Agent, or Firm* — Stonebridge IP, PLLC

(57) ABSTRACT

A fixture for dumpster bottom replacement is provided including four vertical support legs, three fixed horizontal supports, with each horizontal support attached to two vertical supports, one slidable horizontal support which is slidably attached to two fixed horizontal supports, four upper supports which are integral with the vertical support legs or attachable to the vertical support legs and the upper supports comprise a plurality extension supports and one or more push pin assemblies. A kit for dumpster bottom replacement includes a fixture for dumpster bottom replacement as described above and a lift table including a surface capable of holding a dumpster that is vertically adjustable in height. A method of using a dumpster bottom kit includes placing a dumpster on the fixture with the lift table, securing the dumpster with a slidable horizontal support, removing the bottom of the dumpster and welding a new bottom onto the dumpster.

12 Claims, 4 Drawing Sheets

KITS AND METHODS FOR DUMPSTER BOTTOM REPLACEMENT

BACKGROUND OF THE DISCLOSURE

Field of the Invention

This disclosure is generally directed to dumpsters including dumpster bottom replacement kits and methods.

Description of the Related Art

A waste hauler primarily uses steel dumpsters/containers for commercial clients with capacity ranging from 1 yard to 10 yards. The dumpsters are typically stored outside and subject to corrosion from the inside due to acidic waste or from outside environmental conditions including cold weather which produces salt from the salting of roads, and locations near salt water, to name a few examples. Due to these conditions, a steel dumpster will incur corrosion on the bottom of the container usually in the third or fourth year of its lifecycle. To prevent waste from being discharged, the waste hauler will have to bring back the container to a container shop, remove the rusty bottom and replace it with a new bottom. The repaired container can then be recommissioned for use for an additional 3-to-4-year lifecycle.

There are waste hauler container shops that replace dumpster bottoms. There are, however, no standard fixtures or tools to make the repair safe and efficient. Many different methods to replace dumpster bottoms are in use including turning a container on its side, upside down, and placing on a table to repair. Most repair times exceed 2.5 hours due to the lack of proper tools and reliance on unsafe processes that incur heavy lifting.

Accordingly, there is a need in the art for fixtures and proper tooling enabling bottom replacement to be done efficiently with a standard repair time (SRT) of less than one hour (which would be 50% below the current average) and which eliminates any unsafe heavy lifting.

SUMMARY OF THE INVENTION

A fixture for dumpster bottom replacement is provided including four vertical support legs, three fixed horizontal supports, with each horizontal support attached to two vertical supports, one slidable horizontal support which is attached to two fixed horizontal supports and is configured to move along the fixed horizontal supports, four upper vertical supports which are integral with the vertical support legs or attachable to the vertical support legs, or horizontal supports; with the upper supports optionally including a plurality of extension supports; and one or more push pin assemblies. The fixture may further include a bar, preferably steel, which is attachable to, or which rests upon the extension supports included on the upper vertical supports. The fixture may also include an optionally detachable and slidable locking assembly which may be configured to lock or secure a dumpster in place on a fixture. The locking assembly may or may not be slidable and may be configured to attach to two or more sides of a horizontal post or rail and slide along the posts or rails with attachments to lock or secure a dumpster in place on the fixture. The slidable lock assembly may include a lock pin or push pin which can be movably pushed against a dumpster and locked into place to secure the dumpster to a fixture.

A kit for dumpster bottom replacement includes a fixture for dumpster bottom replacement as described above and a lift table including a surface capable of holding a dumpster that is vertically adjustable in height.

A method of using a dumpster bottom fixture and/or kit includes placing a dumpster on the fixture optionally with a lift table, securing the dumpster with a slidable horizontal support, removing the bottom of the dumpster and welding a new bottom onto the dumpster. A method of using a dumpster bottom fixture and/or kit may further include using push pin assemblies to hold and/or press a new bottom on the dumpster while welding.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
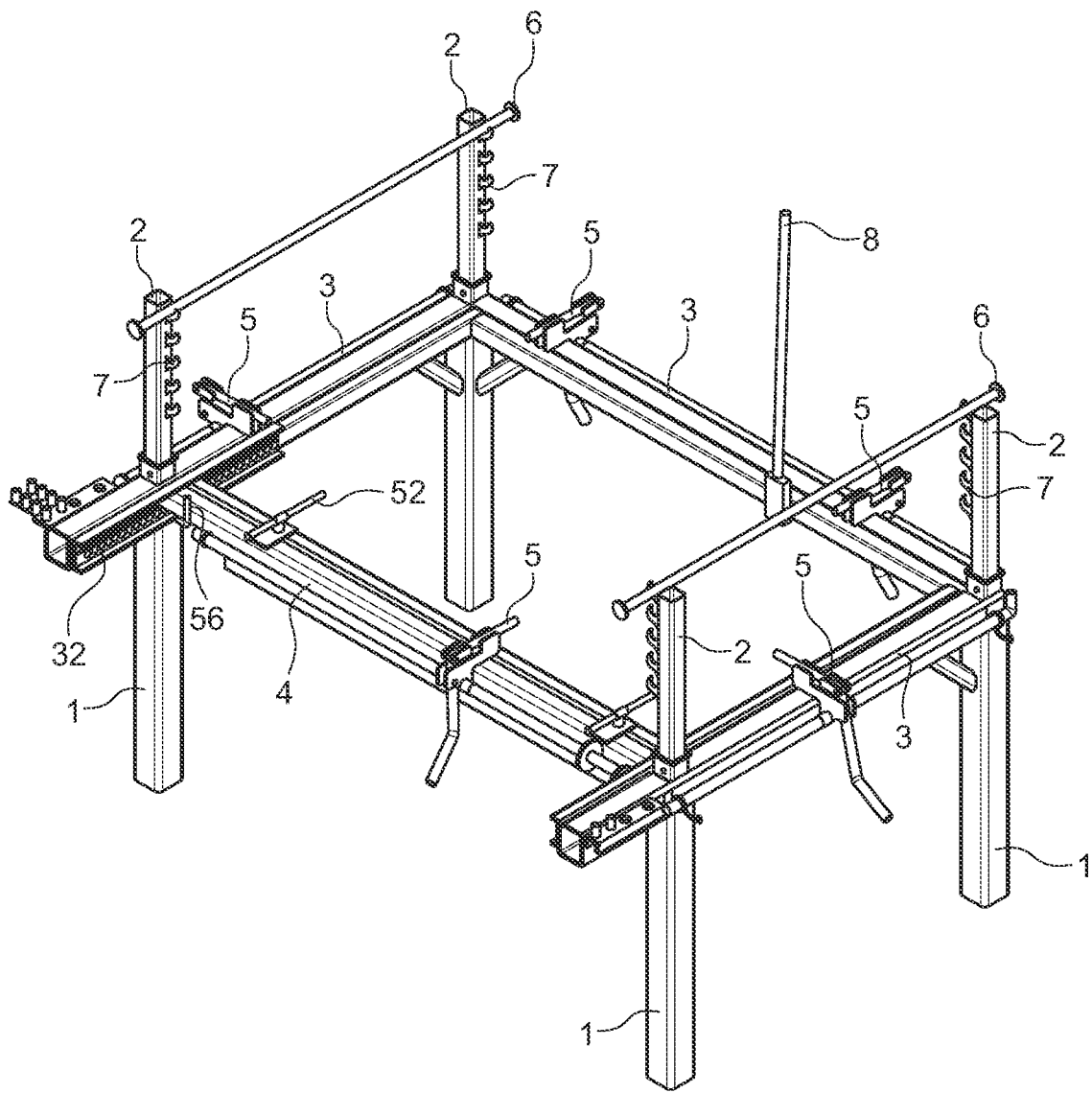
FIG. 1 shows one embodiment of a fixture of the disclosure.

The following detailed description is provided to assist the reader in gaining a comprehensive understanding of the methods, products, and/or systems, described herein. However, various changes, modifications, and equivalents of the methods, products, and/or systems described herein will be apparent to an ordinary skilled artisan.

The bottom replacement fixture, tooling system, and kits of the disclosure provide for a dumpster to be held in place with adjustable height and/or length for different size containers. The container can be loaded or unloaded with, for example, a hoist, jib crane, and/or a forklift. A modified lift cart can be used to unload and realign and/or assist in the new dumpster bottom install. The kit optionally includes tools that assist with providing a guide to remove an old bottom, install a new bottom to an old container and join the sides. In embodiments, this can be accomplished by tac welding on the new bottom. The fixture allows a technician to work at a correct height while performing the repair processes which typically include using a plasma torch, air wrench, and welder.

A dumpster container is a type of movable waste container typically designed to be brought and taken away by a special collection vehicle, or to a bin that a specially designed garbage truck lifts, empties into its hopper, and lowers, on the spot. The term 'dumpster' is a generic trademark of an American brand name. See Dumpster, Wikipedia, The Free Encyclopedia, Date of last revision: 21 Mar. 2021, herein incorporated by reference.

A dumpster bottom replacement kit of the disclosure may include the following components.

An adjustable dumpster fixture accommodating variations in both height and length of a dumpster and, in embodiments, utilizes the pockets or other structure of the dumpster to hold the dumpster in place. The fixture may thus have posts, stands, or supports set at standard widths to accommodate a dumpster. In embodiments the aforementioned structure may for example allow trucks to pick up and empty the containers.

A push arm assembly on the adjustable fixture positioned on all four sides allows a technician to push or hold a new bottom onto an old container. This can be done, for example, while holding a welding gun with another hand. The push arm assembly can move along a sliding track, for example, allowing a technician to tac weld a new bottom in place.

A Lift cart allows for the ease of removing a discarded bottom and position and place a new bottom while container is set in fixture. A lift cart could be placed directly beneath the central opening of the fixture to lift a dumpster into place.

An optional air wrench tool allows a technician to use greater force to push a new bottom riser in place and/or keep in place while a technician works on an opposing side of a container. A riser is a section of a new dumpster bottom that extends up the side of a dumpster from the bottom. In embodiments, a riser is integral with the bottom and is formed by bending. The wrench tool may utilize various adapters that work with off the shelf cordless air wrenches.

Optional straight-line guides allow a technician to plasma cut an old bottom to a new bottom, with e.g., a 4", 6", or 8" riser, maintains the same cubic yard size as the old container.

In embodiments, one removable and slidable support of a fixture allows for accommodating varying lengths of dumpster containers along with a way to load and remove the container.

An optional straightener tool to straighten a riser to a 90-degree angle in case the sides are damaged and eliminate gaps in the bottom corners.

Optional steel safety rods with stops used to hold the container in place and ensure that a container does not shift and fall off a fixture.

An optional steel angle assists in the centering of a new bottom onto an old container.

In embodiments, a fixture comprises four legs, stands, posts, or the like (but may have six, seven, eight, or more legs or stands or posts in other embodiments). The fixture is configured to securely and adjustably hold a dumpster in place while a dumpster bottom is being replaced. The fixture may be configured to adjust the height that a dumpster container is held at (while being worked on). In embodiments, the fixture may include a plurality of extended supports, extensions, lips, flanges, etc., which can be used to support a dumpster at varying heights. In one embodiment, a series of detachable or movable supports are disposed on each of the posts or support legs. The detachable supports may be configured to hold a bar, for example a steel bar, in a horizontal position relative to ground. Steel bars on opposite sides of a fixture may then be positioned at a variety of different heights (relative to the ground) to hold a dumpster in a secure and fixed position at a correct height for dumpster bottom replacement. In embodiments a steel bar may hold the dumpster by being positioned under the pockets on the sides of a dumpster container which are usually used for lifting and emptying a dumpster container.

The fixture may also include an optionally detachable and slidable support which may be configured to lock or secure a dumpster in place on a fixture. For example, the slidable support may be configured to attach to two sides of a horizontal post or rail and slide along the posts or rails with attachments to lock or secure a dumpster in place on the fixture.

As mentioned, a dumpster fixture may also optionally include up to four push arm assemblies. The push arm assemblies may be slidably attached along four sides of the fixture and may be used to assist in welding a new bottom onto a container.

The fixture is preferably made from steel and preferably steel tubular components to achieve the strength requirements to hold dumpster containers that vary in weight and can be up to 1200 lbs or more. In embodiments, carbon steel may be used with a carbon content of from about 0.05 to about 4% by weight carbon. Low carbon (or mild carbon) may preferably be used with a carbon content of about 0.05% to about 0.3% carbon by weight. See Carbon steel, Wikipedia, The Free Encyclopedia, Date of last revision: 23 Mar. 2021, herein incorporated by reference.

Figure 3:
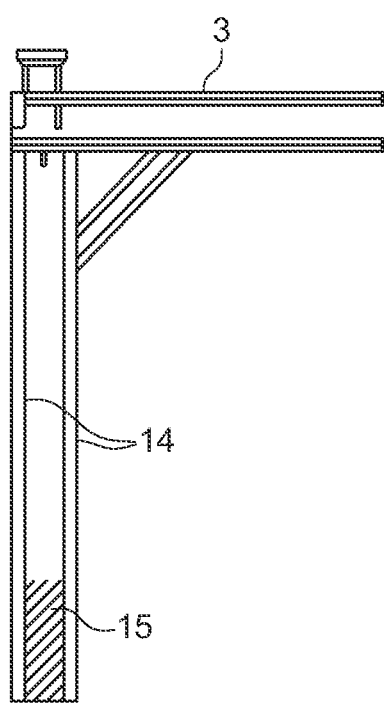
FIG. 3 shows an embodiment of a support leg of the disclosure.

For more efficient shipping, the fixture can be provided in pieces and welded and erected on site. In one embodiment, a fixture may include hollow support legs that include three pieces. Two outer leg components that are connected by a sleeve that can be, for example, welded in place by a customer on site. This arrangement for a support leg is shown in FIG. 3.

In embodiments, the fixture may be around 70-75 inches wide on one side to accommodate standard dumpster bottoms of about 72-73 inches. On the other side the width is adjustable and may be in the range of about 30-60 inches and preferably about 36 to about 54 inches. The width may be adjusted with a slidable support.

The tools are typically made from steel including rolled steel, hot rolled steel, low carbon steel, etc., and some components like springs and rods can also be sourced and modified from off the shelf components, e.g., from Grainger™ or McMaster-Carr™. The quantities of each tool can vary with each, based on customer preference.

The lift table and guide rails may not be required in a kit. In some embodiments, a container can be loaded/unloaded differently, e.g., via jib cranes or hoists.

A Lift table can include a deck to provide for a dumpster with for example a standard 72" wide dumpster bottom.

Lift tables or carts are commonly used to position loads at an ergonomic height for packaging and assembly operations, to interface with machinery, and to change elevations of various logistics infrastructures and may be hydraulically operated.

Standard lift tables may have a capacity between about 2,000 and 6,000 lbs, have a lowered height around 7", vertical travel of 24" to 60" and platform widths of 24" to 72" or more. Standard lift tables make up the bulk of lift table applications and can be customized to fit specific requirements. See e.g., Lift Table, Wikipedia, The Free Encyclopedia, Date of last revision: 5 Jul. 2020, herein incorporated by reference.

A fixture as contemplated herein is a work-holding or support device. A fixture of the disclosure may be used to securely locate, for example, or position a dumpster in a specific location or orientation, and support bottom replacement work. A fixture of the disclosure enables consistency, interchangeability, and reliability for the dumpsters repaired and produced using the fixture. Using a fixture of the disclosure improves economy of production by allowing smooth operation and quick transition, simplifies how workpieces are mounted, and increases uniformity.

FIG. 1 shows one embodiment of a fixture of the disclosure. FIG. 1 shows legs 1, support posts 2, horizontal posts 3, removable sliding support 4, sliding push arm assemblies 5, steel support bar 6, mounts 7, and safety rod 8. FIG. 1 further shows push tool 52, in embodiments operated by an air wrench (not shown), to push a new bottom onto an old dumpster. FIG. 1 also shows slide locking mechanism 32 which functions to allow slidable support 4 to slidably move into various positions. Handle lock 56 can be used to lock the slidable support 4 into position.

Figure 2:
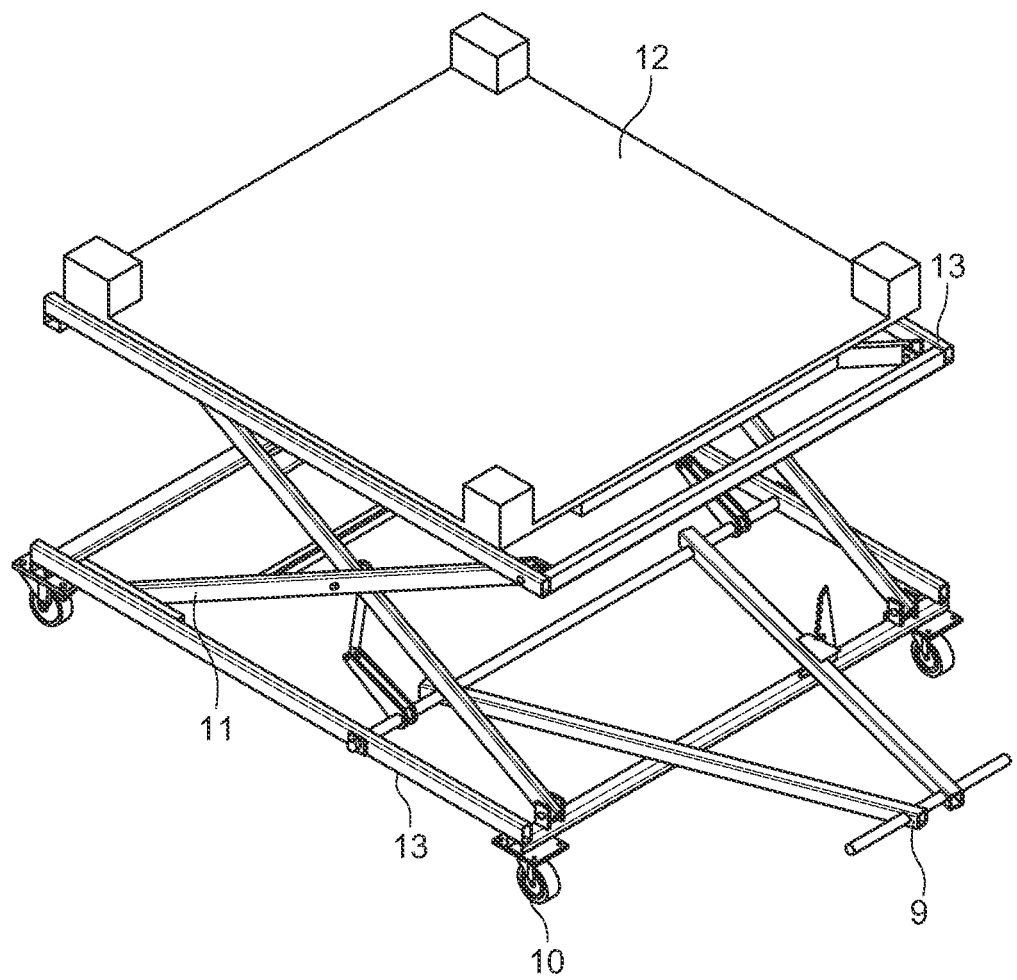
FIG. 2 shows one embodiment of a lift cart of the disclosure.

FIG. 2 shows a lift cart of the disclosure. FIG. 2 shows lift cart frame 13, handle 9, lifts 11, and lift table surface 12.

FIG. 3 shows an embodiment of a support leg of the disclosure. FIG. 3 shows support legs 14 along with insert or sleeve 15. Insert 15 can be welded into place on site and allows the support legs to be provided in separate pieces 14 for easy transport.

Figure 4:
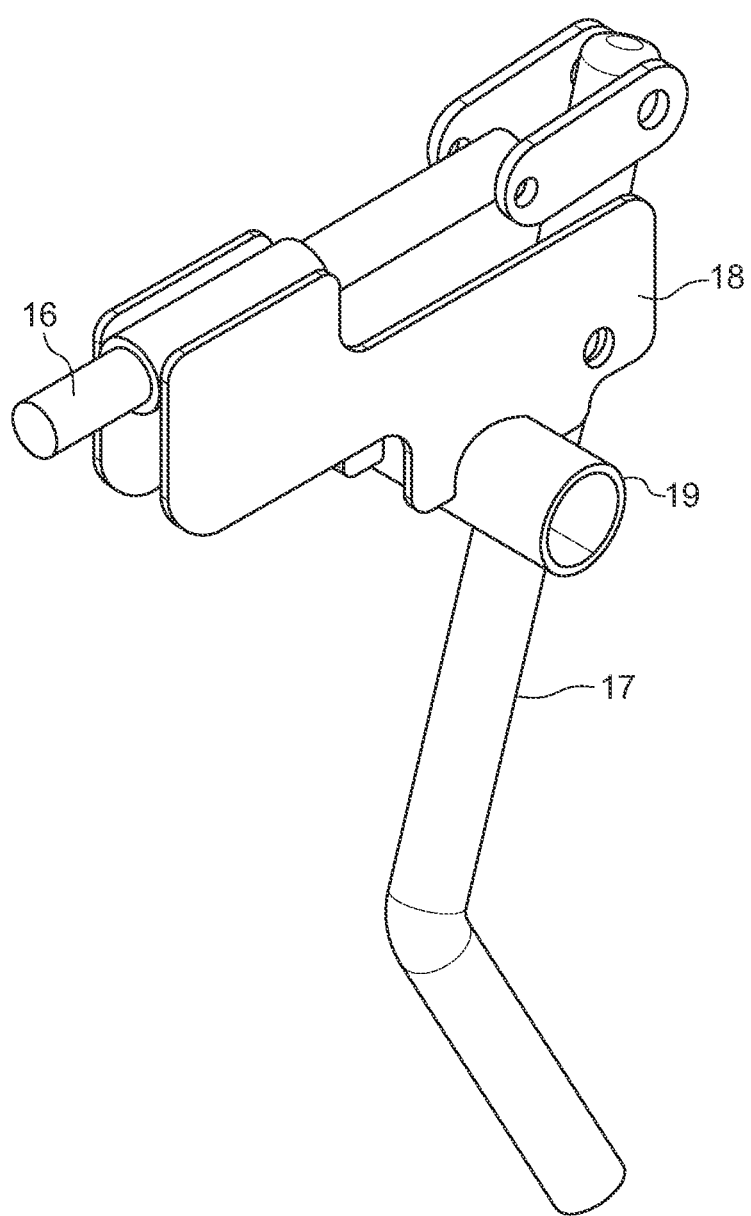
FIG. 4 shows an embodiment of a push arm assembly of the disclosure.

FIG. 4 shows an embodiment of a push arm assembly of the disclosure. Push arm assembly includes push pin 16, arm 17, bracket 18 and roll pin 19. The push arm configuration illustrated in FIG. 4 allows a push pin assembly to be attached to a fixture through arm 17. Push pin 16 can be pushed or extended by rotation/extension of the bracket assembly 18, e.g., in the direction of a dumpster to push the push pin 16 against a dumpster.

While this disclosure includes specific examples, it will be apparent after an understanding of the disclosure of this application has been attained that various changes in form and details may be made in these examples without departing from the spirit and scope of the claims and their equivalents.

The invention claimed is:

1. A fixture for dumpster bottom replacement comprising:
   four vertical support legs;
   three fixed horizontal supports, wherein each horizontal support is attached to two vertical supports;
   one slidable horizontal support which is slidably attached to two fixed horizontal supports and which may be locked into position along the fixed horizontal supports to form a rectangular horizontal frame 70-75 inches wide on one side and 30-60 inches wide on the other;
   four upper supports which are integral with the vertical support legs or attachable to the vertical support legs and wherein the upper supports comprise a plurality extension supports;
   one or more push pin assemblies.

2. The fixture of claim 1, wherein the rectangular horizontal frame is 70-73 inches on one side and 36-54 inches on the other side.

3. The fixture of claim 1, further comprising a bar which is attachable to, or which rests on the extension supports.

4. The fixture of claim 3, wherein the vertical support legs, the horizontal supports, and the bar comprise steel.

5. The fixture of claim 4, wherein the steel is low carbon steel.

6. The fixture of claim 1, comprising four push pin assemblies.

7. A kit for dumpster bottom replacement comprising:
   a fixture for dumpster bottom replacement of claim 1; and
   a lift table comprising a surface capable of holding a dumpster that is vertically adjustable in height.

8. The kit of claim 7, wherein the lift table surface is vertically adjustable in height by a hydraulic mechanism.

9. The kit of claim 7, further comprising an air wrench tool.

10. The kit of claim 7, further comprising a straightener tool.

11. A method of using the kit of claim 7 comprising:
    placing a dumpster on the fixture with the lift table;
    securing the dumpster with the slidable horizontal support;
    removing the bottom of the dumpster; and
    welding a new bottom onto the dumpster.

12. The method of claim 11, further comprising using the push pin assemblies to hold the new bottom on the dumpster while welding.

\* \* \* \* \*